United States Patent
LaVoie et al.

(10) Patent No.: US 8,176,161 B2
(45) Date of Patent: May 8, 2012

(54) METHOD AND SYSTEM FOR CONTENT-BASED ROUTING OF NETWORK TRAFFIC

(75) Inventors: Jason Dana LaVoie, Westford, MA (US); Gordon Hegfield, Westford, MA (US); Russell Holden, Westford, MA (US); Chester E. Ryder, III, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/485,653

(22) Filed: Jun. 16, 2009

(65) Prior Publication Data

US 2010/0318679 A1    Dec. 16, 2010

(51) Int. Cl.
*G06F 15/173*    (2006.01)
(52) U.S. Cl. ......... 709/223; 709/203; 709/217; 718/105
(58) Field of Classification Search .................. 709/223, 709/224, 203, 217, 219; 718/104, 105
See application file for complete search history.

(56) References Cited

U.S. PATENT DOCUMENTS

| | | | | |
|---|---|---|---|---|
| 5,946,680 | A * | 8/1999 | Shorter et al. | 1/1 |
| 6,415,323 | B1 * | 7/2002 | McCanne et al. | 709/225 |
| 6,578,066 | B1 * | 6/2003 | Logan et al. | 718/105 |
| 7,376,827 | B1 | 5/2008 | Jiao | |
| 2006/0101507 | A1 * | 5/2006 | Camenisch | 726/5 |
| 2007/0226294 | A1 * | 9/2007 | Pruitt et al. | 709/203 |
| 2008/0307438 | A1 * | 12/2008 | Creamer et al. | 719/318 |

OTHER PUBLICATIONS http://www.cisco.com/en/US/products/ps6480; (Oct. 6, 2011), pp. 1-2.

* cited by examiner

*Primary Examiner* — LaShonda Jacobs
(74) *Attorney, Agent, or Firm* — Holland & Knight LLP; Brian J Colandreo, Esq.; V. Raman Bharatula, Esq.

(57) ABSTRACT

A method, computer program product, and system for routing computer network traffic include associating, on a routing device, a unique identifier with at least one application server running an application. Network traffic that includes the unique identifier and an intended network address may be received. In response to receiving the network traffic at least one of the application servers associated with the unique identifier may be identified. The network traffic may be forwarded to at least one of the application servers associated with the unique identifier.

24 Claims, 7 Drawing Sheets

METHOD AND SYSTEM FOR CONTENT-BASED ROUTING OF NETWORK TRAFFIC

BACKGROUND OF THE INVENTION

This disclosure relates to routing and, more particularly, to routing network traffic based on a unique identifier.

Client/server applications are ubiquitous in today's networked computing environment. Users may access software and services provided by a server from virtually any networked client device. For example, a user of a web-based email service may access his or her email from a personal computer, a public computer, a work computer, a personal digital assistant ("PDA"), a cell phone, or any other device.

The server or servers that provide the email service typically may store and retain the user's data, including the user's email and account settings. If there are many users of the service, multiple servers may be needed to process all the requests from the users. Typically, when a user accesses the service, his or her request may be passed to one of the servers (or one group/cluster of servers) for processing.

The user request may take the form of network traffic. For example, when a user signs into his or her web-based email account, the web-based email account may generate network traffic that travels from the user's device to the server and vice versa. The network traffic may include user data, such as a username, password, and/or an authentication, for example. The network traffic may also include data specific to the application, such as email data or other data. As one skilled in the art will recognize, data specific to the application may be typically encapsulated in an application layer of the network traffic, such as OSI layer-7 data.

The network traffic sent by the client device typically may include a network destination address. The client device or client application may receive the network destination address, which may be the address of one of the servers, via a directory name search ("DNS") service, for example, then insert the network destination address into the network traffic. The client may then send the network traffic out onto a network where the network traffic is eventually routed to the network traffic's destination.

Typically, the network destination address may be any one of the servers (or groups/clusters of servers) that process user requests. Since the user's network traffic may be received by any of the servers, the servers may have to synchronize the user's data. For example, each server may have to retain a copy of the user's data in case the server receives a request from the user to access the data. When the data changes, all the servers may have to synchronize the user's data so that the user does not access out-of-date data. This approach may be problematic because each server will have to maintain its own storage, and because constant synchronization between the servers may cause network contention. Alternatively, each server may have to access a centralized data store that retains a single copy of the data. This approach also may be problematic because it requires a central data store with significant processing power and network bandwidth. This approach may also cause network contention. Alternatively, a system may have multiple back-end data stores. This approach is also problematic because it requires synchronization between the back-end data stores so that the user does not access out-of-date data. The constant synchronization with this approach can also cause network contention and result in a user accessing out-of-date data.

BRIEF SUMMARY OF THE INVENTION

In an embodiment, a method of routing computer network traffic includes associating, on a routing device, a unique identifier with at least one application server running an application. The routing device receives network traffic that includes the unique identifier and an intended network address. In response to receiving the network traffic at least one of the application servers associated with the unique identifier is identified. The network traffic is forwarded to at least one of the application servers associated with the unique identifier.

One or more of the following features may be included. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with the unique identifier.

The unique identifier may include information identifying a user of the application running on the at least one application server. A storage device of the at least one application server may store data associated with the unique identifier; and the data may exist only on one application server associated with the unique identifier. The unique identifier may also be included in application layer network traffic.

In another embodiment, a computer program product for routing computer network traffic resides on a computer readable storage device. The computer program product includes a plurality of instructions, which, when executed by a processor, cause the processor to perform operations including associating a unique identifier with at least one application server running an application. The operations also cause the processor to receive network traffic that includes the unique identifier and an intended network address. In response to receiving the network traffic, at least one of the application servers associated with the unique identifier is identified. The network traffic is forwarded to at least one of the application servers associated with the unique identifier.

One or more of the following features may be included. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with said unique identifier.

The unique identifier may include information identifying a user of the application running on the at least one application server. A storage device of the at least one application server may store data associated with the unique identifier; and the data may exist only on one application server associated with said unique identifier. The unique identifier may also be included in application layer network traffic.

In another embodiment, system includes one or more processors, one or more computer readable storage devices coupled to the one or more processors, and one or more software instructions residing on the one or more computer readable storage devices, which, when executed by the processor, cause the processor to perform operations. The operations include associating a unique identifier with at least one application server running an application. The operations may also include receiving network traffic that includes the unique identifier and an intended network address. In response to receiving said network traffic, at least one of the application servers associated with the unique identifier may be identified. The network traffic may be forwarded to at least one of the application servers associated with the unique identifier.

One or more of the following features may be included. The network traffic may be forwarded to one or more second application servers associated with the unique identifier if the one or more application servers are not available. Identifying at least one of the application servers may include performing a directory lookup based on the unique identifier, and receiving a list of the one or more application servers associated with the unique identifier. The list may be sorted in a priority order for routing. The intended network address also may be overwritten with an address of at least one of the application servers associated with the unique identifier.

The unique identifier may include information identifying a user of the application running on the at least one application server. A storage device of the at least one application server may store data associated with the unique identifier; and the data may exist only on one application server associated with the unique identifier. The unique identifier may also be included in application layer network traffic.

The details of one or more implementations are set forth in the accompanying drawings and the description below. Other features and advantages will become apparent from the description, the drawing, and the claims.

BRIEF DESCRIPTION OF THE SEVERAL VIEWS OF THE DRAWINGS

Like references in the drawings denote like elements.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium (i.e. computer-readable storage device) would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium (i.e. computer-readable storage device) may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electromagnetic, optical, or any suitable combination thereof. A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
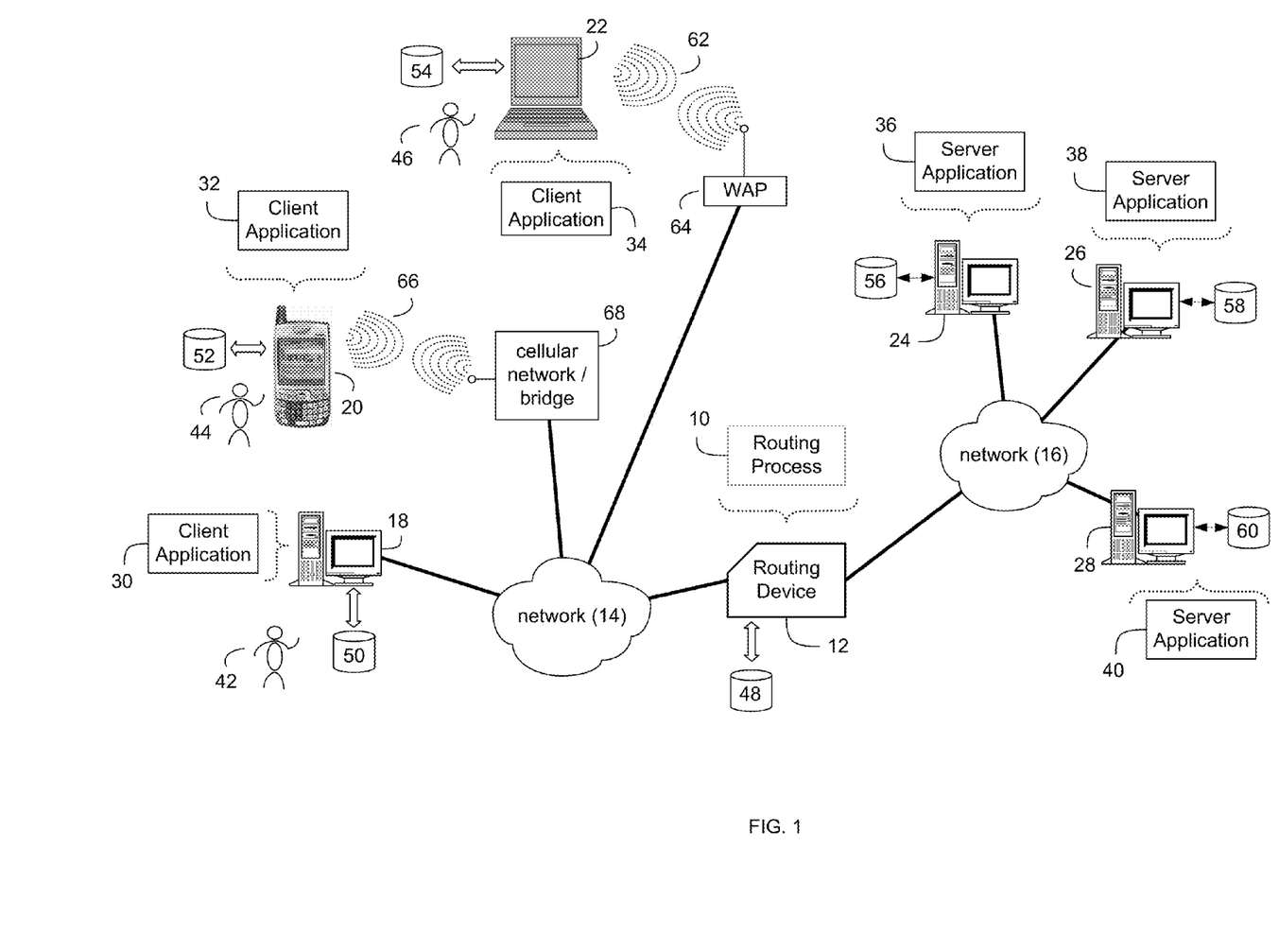
FIG. 1 is diagrammatic view of a routing process coupled to a distributed computing network.

Referring to the figures, FIG. 1 depicts a computing infrastructure within which routing process 10 may operate. Routing process 10, for example, may reside on and may be executed by routing device 12, which may be connected to multiple networks (e.g., the Internet, wide area networks, and/or local area networks) and may route network traffic between the networks. In FIG. 1, routing device 12 is shown connected to network 14 and network 16. Routing device 12 may be a dedicated routing device, a switch, a hub, or a computing device executing software that routes network traffic. In general, routing device 12 may be any device that routes network traffic. Examples of routing device 12 may include, but are not limited to: a personal computer, a server computer, a series of server or personal computers, a mini computer, and a mainframe computer, a router, a network switch, a network hub, etc.

Various network devices may be connected to networks 14 and 16. For example, computer 18, personal digital assistant (PDA) 20, and laptop 22 are shown connected to network 14. Also, servers 24, 26, 28 are shown connected to network 16. As one skilled in the art will recognize, any network device may connect to any network connected to routing device 12.

FIG. 1 also depicts client applications 30, 32, 34, which may reside on and may be executed by computer 18, PDA 20, and laptop 22, respectively. Also, server applications 36, 38, 40 may reside on and be executed by servers 24, 26, and 28, respectively. Client applications 30, 32, 34 and server applications 36, 38, 40 may constitute a client/server application. For example, client applications 30, 32, 34 may be email client applications executed by the various client devices, and server applications 36, 38, 40 may be email server applications executed by email servers. Client applications 30, 32, 34 may communicate with server applications 36, 38, 40, for example, to send and receive email. For example, if users 42, 44, 46 access client applications 30, 32, 34 to check or send email, client applications 30, 32, 34 may send email data to server applications 36, 38, 40 and/or receive email data from server applications 36, 38, 40. During the course of client/server communication, the email data may travel through network 14, routing device 12, and/or network 16. Although this example uses email clients and servers as an illustration, one skilled in the art will recognize that routing process 12 may operate with any type of network traffic and any type of client/server application.

The instruction sets and subroutines of routing process 10 may be stored on storage device 48, coupled to routing device 12. Storage device 48 may be a computer readable storage device, which may include hard disk drives, solid state drives, tape drives, optical drives, RAID arrays, random access memory (RAM), read-only memory (ROM), etc. Routing device 12 may also include a processor (not shown) which may execute the instruction sets and subroutines of routing process 10. As will be discussed below in greater detail, the instruction sets and subroutines of routing process 10 may cause routing device 12's processor(s) to perform operations including: associating a unique identifier with at least one application server, receiving network traffic that may include the unique identifier and an intended network address, identifying at least one of the application servers associated with the unique identifier, and forwarding the network traffic.

Similarly, the instruction sets and subroutines of client applications 30, 32, 22 may reside on storage devices 50, 52, 54, respectively, and may be executed by one or more processors coupled to computer 18, PDA 20, and laptop 22, respectively; and the instruction sets and subroutines of server applications 36, 38, 40 may reside on storage devices 56, 58, 60, and may be executed by one or more processors coupled to server computers 24, 26, 28, respectively. Storage devices 48, 50, 52, 54, 56, 58, 60 may be computer readable storage medium, and may include hard disk drives, solid state drives, tape drives, optical drives, RAID arrays, random access memory (RAM), read-only memory (ROM), etc.

The various network devices shown in FIG. 1 (including routing device 12, computer 18, PDA 20, laptop 22, and servers 24, 26, 28) may run network operating systems, examples of which may include but are not limited to: Microsoft Windows XP® Server; Novell® Netware®; or Redhat® Linux®, for example (Windows XP is a registered trademark of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Alternatively, the various network devices in FIG. 1 may run custom operating systems, custom network operating systems, and/or custom software applications that allow the various network devices to operate.

The instruction sets and subroutines of routing process 10, client applications 30, 32, 34, and server applications 36, 38, 40 may be generated through the use of a compiler, such as the IBM XL compiler, the Visual Studio® compiler, or an assembler, for example (Visual Studio is a registered trademark of Microsoft Corporation in the United States, other countries, or both). The instruction set and subroutines may also be generated as scripts, such as JavaScript® scripts, Tcl scripts, or as other types of software code (Java and all Java-based trademarks and logos are trademarks of Sun Microsystems, Inc. in the United States, other countries, or both). In general, and as is known in the art, the instruction sets and subroutines of routing process 10, client applications 30, 32, 34, and server applications 36, 38, 40 may be generated via any method of generating instruction sets and subroutines that may be executed by a processor.

As mentioned, various client electronic devices may be coupled to network 14. Examples of client electronic devices may include, but are not limited to: routing device 12, computer 18, PDA 20, laptop 22, server computers 24-28, a data-enabled, cellular telephone (not shown), and a dedicated network device (not shown). One or more users (e.g., user 42, 44, 46) may access the various tools and applications, such as routing process 10, client applications 30, 32, 34, or server applications 36, 38, 40 from any other device connected to networks 14, 16 or directly from the device on which the tool or application resides.

Network devices may be coupled directly to network 14, 16, or may be indirectly coupled to network 14, 16 through routing device 12. For example, computer 18 is shown directly coupled to network 14. However, computer 18 may access network 16 and network devices connected to network 16 indirectly, by sending network traffic through routing device 12.

The various client electronic devices may also be directly or indirectly coupled to networks 14, 16 through various types of wired and wireless connections. For example, routing device 12 is shown directly coupled to networks 14, 16 via hardwired network connections. Laptop 22 is shown wirelessly coupled to network 14 via wireless communication channel 62 established between laptop 22 and wireless access point (i.e., WAP) 64, which is shown directly coupled to network 14. WAP 64 may be, for example, an IEEE 802.11a, 802.11b, 802.11g, Wi-Fi, and/or Bluetooth device that is capable of establishing wireless communication channel 62 between laptop 22 and WAP 64. PDA 20 is shown wirelessly coupled to network 14 via cellular communication channel 66 and cellular network/bridge 68, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
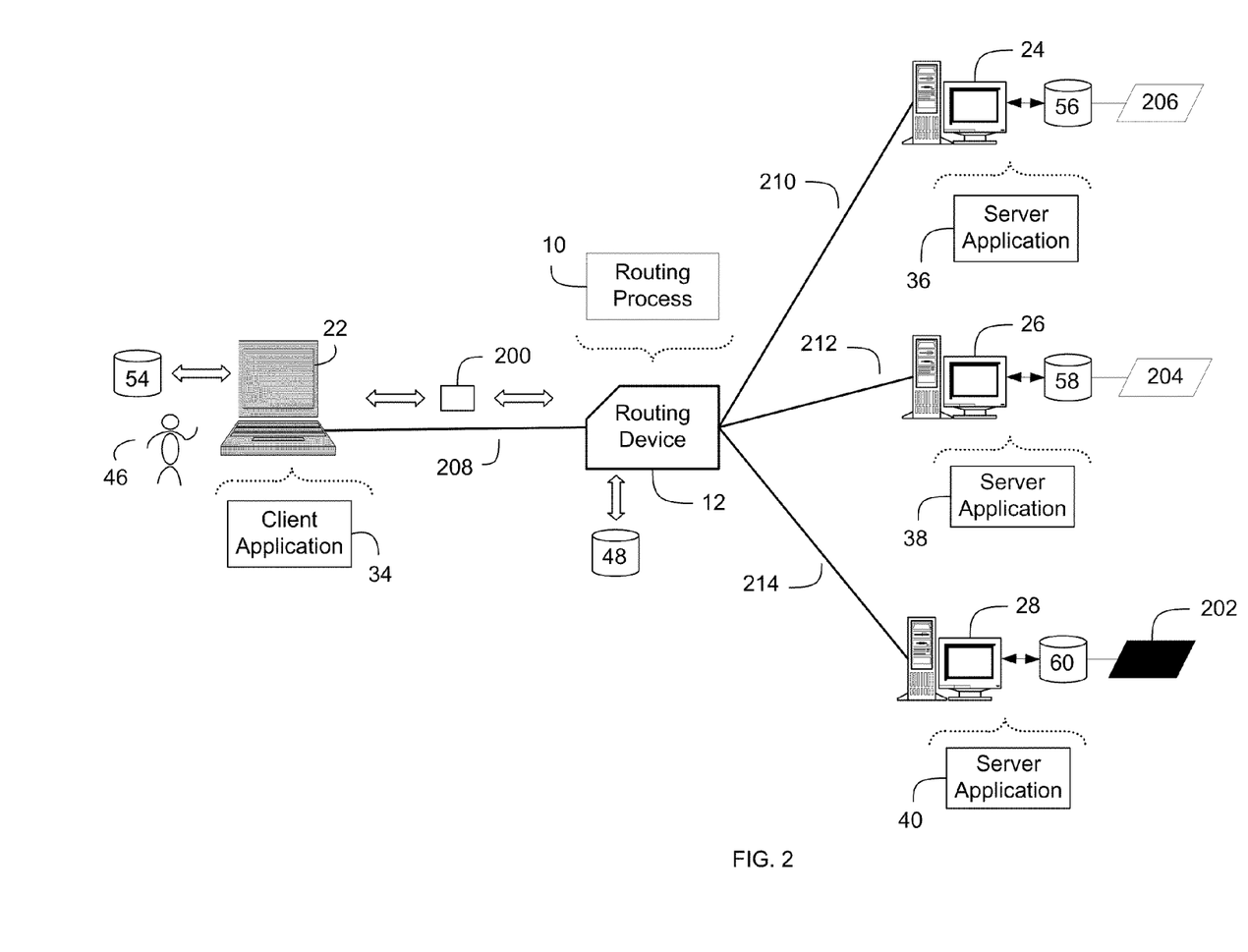
FIG. 2 is a simplified view of the diagrammatic view of FIG. 1.

FIG. 2 is a simplified version of the computing infrastructure of FIG. 1, for the purpose of illustrating how a client device may access server applications 36, 38, 40 through routing device 12. In FIG. 2, laptop 22 is shown connected to routing device 12, which is connected to server computers 24, 26, 28. As mentioned, routing device 12 may be a routing device that connects two or more networks. In this example, laptop 22 may be on one network, and server computers 24, 26, 28 may be on another network, connected together by routing device 12. Although not shown, server computers 24, 26, 28 each may be a single sever, or a group/cluster of servers that execute server applications 36, 38, 40.

In a typical scenario, user 46 may wish to check his/her email. User 46 may then access client application 34 (an email client, in this example), and may enter his/her username and password. Subsequently, client application 34 may attempt to send data, e.g. network traffic 200, that includes user 46's username and password to a server, such as server computers 36, 38, 40.

Servers 24, 26, 28 may be servers of the same application. For example, servers 24, 26, 28 may all be email servers that provide service for an email system. As noted, servers 24, 26, 28 each may be single servers or groups/clusters of servers. In FIG. 2 and this example, however, only server 28 may retain a copy of user 46's data. Server 28 may store data 202, which may include user 46's data, as illustrated by the shading of data 202. Data 204, 206 (and therefore servers 24, 26) may not include user 46's data, for example. Therefore, as user 46 attempts to access his or her email, user 46 may be directed to server 28.

Network traffic 200 may be data or information that may be transmitted across or through a computer network. FIG. 200 shows network traffic 200 transmitted through network connection 208. Although not shown, network traffic 200 may be data or information transmitted through any network, e.g. network connections 210, 212, 214. Network traffic 200 may include various types of network data and information. For example, network traffic 200 may include a network packet (e.g. an IP packet), a network broadcast, or any type of data sent over a network.

Figure 3:
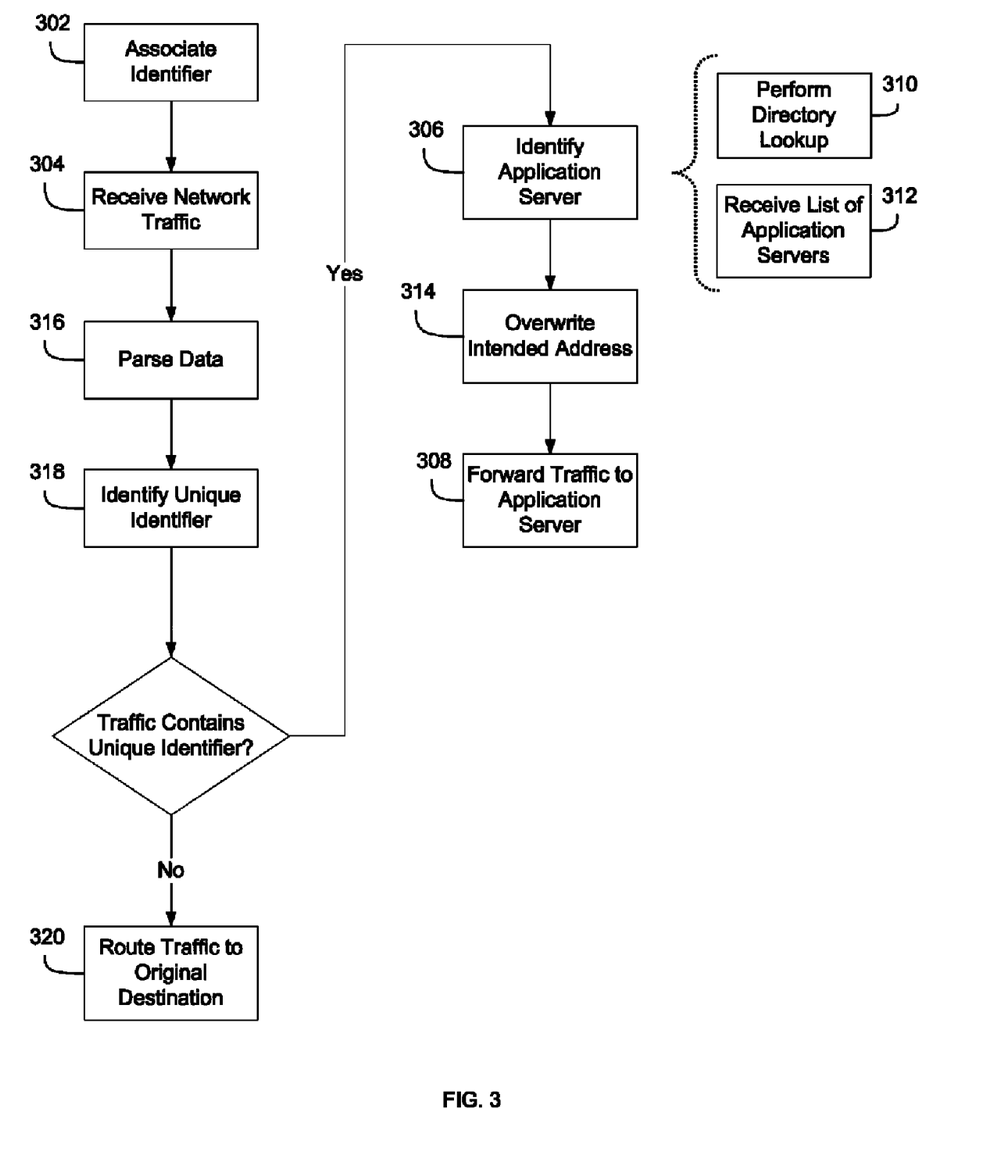
FIG. 3 is a flowchart diagram of a routing process.

Referring to FIG. 3, routing process 10 may allow user 46 to interact with server 28 (e.g., which may include user 46's data), and may route data from user 46 to server 28, regardless of whether the data was originally intended for or addressed to server 28. For example, routing process 10 may associate 302 a unique identifier with at least one application server running an application. Routing process 10 may also receive 304 network traffic including the unique identifier and an intended network address. Routing process 10 may identify 306 at least one of the application servers associated with the unique identifier, and may forward 308 the network traffic to the application server(s) associated with the unique identifier. For example, if user 46 enters his/her username and password, client application 34 may send network traffic out onto the network to authenticate user 46's username and password. Client application 34 may not be able to determine that user 46's data resides on server 28, and not on servers 24, 26, so client application 34 may address the network traffic to routing device 12 and/or server 24, for example. However, routing process 10 may have associated 302 a unique identifier (such as user 46's username) with server 28. If the network traffic contains the unique identifier (i.e. user 46's username and password), routing process 10 may, for example, perform 310 a directory lookup based on the unique identifier and receive 312 a list of servers associated with the unique identifier. Routing process 10 may then forward 308 the data to server 28 instead of routing device 12 and/or server 24, for example. In order to forward 308 the data to server 28, routing process 10 may overwrite 314 the network traffic's original network address (i.e. the address of routing device 12 and/or server 24) with the address of one or more of the servers from the received 312 list of servers.

When routing process 10 receives 304 network traffic, routing process 10 may parse 316 the data contained in the network traffic to determine whether the network traffic contains a unique identifier. If the network traffic contains a unique identifier, routing process 10 may identify 318 the unique identifier to determine whether routing process 10 should forward 320 the network traffic to the network traffic's original destination, or whether routing process 10 should identify 306 an application server to which routing process 10 should forward 308 the network traffic, for example.

Figure 4:
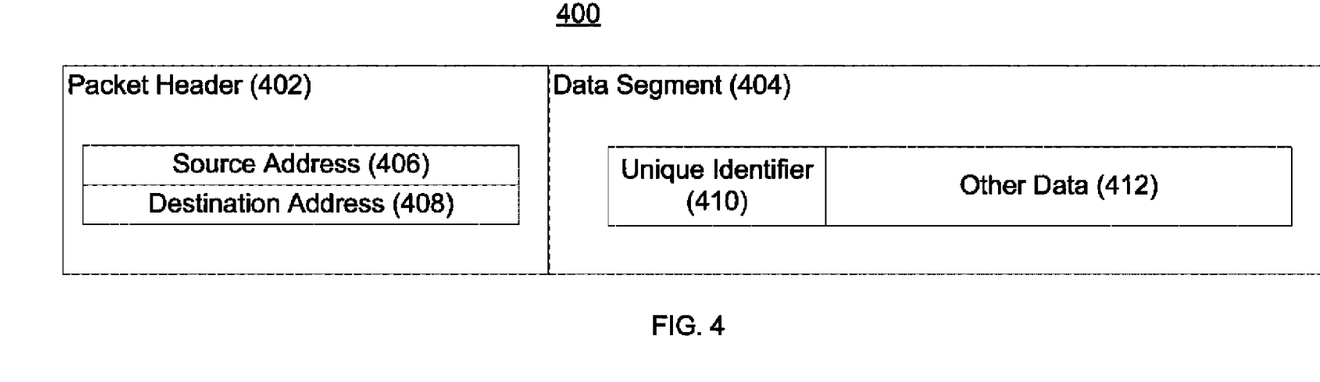
FIG. 4 is a diagrammatic view of a network traffic packet.

In an embodiment, the unique identifier may be information found within an application layer data of the network traffic. Using the internet protocol ("IP") as an example, network traffic 200 may be an IP network packet, such as network packet 400, which may include a header section and a data section. FIG. 4 shows network packet 400 with packet header 402 and a data segment 404. Packet header 402 may include source address 406 and destination address 408. Source address 406 may identify the device that originated the network packet. For example, if laptop 22 (FIG. 2) originated the network packet, source address 406 may be the address of laptop 22. Similarly, destination address 408 may identify an intended destination address for the network packet. If client application 34 attempts to send network packet 400 to routing device 12 and/or server computer 24, destination address 408 may contain the network address of routing device 12 and/or server computer 24. Using the IP protocol as an example, source address 406 and destination address 408 may be an IP address: a series of four integers such as 192.168.1.2, for example. However, one skilled in the art will recognize that source address 406 and destination address 408 maybe any type of networking address including, but not limited to: IPv4 addresses, IPv6 addresses, UDP addresses, token ring addresses, MAC addresses, universal serial bus ("USB") addresses, etc.

Upon receiving packet 400, routing process 10 may parse 316 data from data segment 404, which may include unique identifier 410. Routing process 10 may employ any of a number of schemes to determine whether to parse 316 data from data segment 404. For example, routing process 10 may parse 316 data from every network packet received by routing device 12. Alternatively, routing process 10 may parse 316 data from network packets that contain a particular destination address, or a destination address that falls within a particular range. For example, routing process 10 may parse 316 the data from every packet addressed to a particular IP domain (e.g. every network packet addressed to a device in the 192.168.1.* subnet). As another example, routing process 10 may parse 316 data from network packets having a particular source address, or a source address that falls within a particular range of addresses. As another example, routing process 10 may parse 316 data from data from network packets that have a particular network packet format (e.g. TCP or UDP), or that contain a particular type of data. In general, routing process 10 may selectively choose and filter the network packets from which routing process 10 reads data, based on any information available within or associated with the network packet.

Data segment 404 may also include other data 412, which may be any other network traffic data. Routing process 10 may, for example, identify 318 unique identifier 410 by parsing 316 the data from data segment 404. Unique identifier 410 may be data that uniquely identifies user 46, i.e. the user attempting to access the server application. For example, unique identifier 410 may be user 46's authenticated username, user 46's unauthenticated username, or any other information that uniquely identifies user 46. Of course, unique identifier 410 need not be associated with a user. Unique identifier may be any data that associates network traffic with a specific server or group of servers. In another example, unique identifier 410 may be a global positioning system ("GPS") coordinate or range of coordinates associated with a particular server. In this example, the particular server may be assigned to process data that contains particular GPS coordinates, rather than data that identifies a particular user. The particular server may be, for example, assigned to service data that includes the GPS coordinates within a particular range. Accordingly, data segment 404 may contain unique identifier 410, which may be a GPS coordinate, rather than a unique identifier that identifies a particular user. Routing process 10 may identify 306 the server by parsing data segment 404, identifying 318 the GPS coordinates (or range of coordinates) within data segment 404, identifying 306 a server (or servers) associated with the GPS coordinates, and forwarding 308 packet 400 to the server associated with the parsed GPS coordination. As one skilled in the art will recognize, unique identifier may be any form or type of data that may be associated with or mapped to a server, including, but not limited to: a username, a password, a location, a temperature, a status identifier, a GUID, a version ID, and application ID, or any other type of data.

Figure 5:
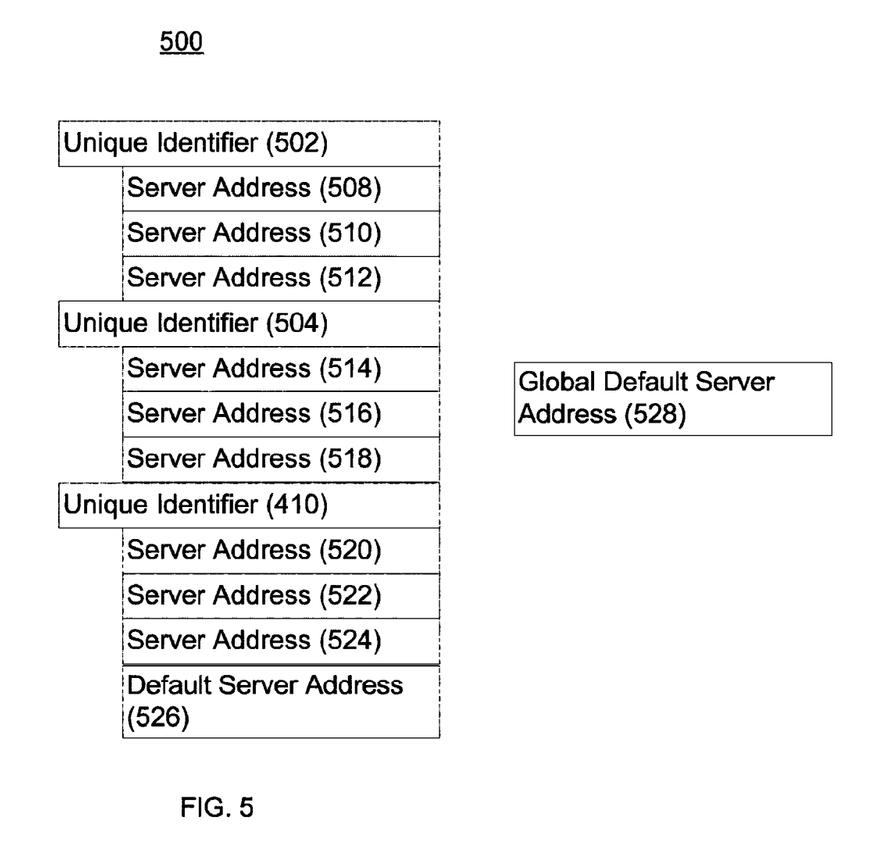
FIG. 5 is a table of associations between unique identifiers and server addresses

After receiving unique identifier 410, routing process 10 may identify 306 one or more application servers associated with unique identifier 410. As mentioned, and as shown in FIG. 2, user 46's data may be stored on server 28. Continuing the example, routing process 10 may associate 302 user 46's username (a unique identifier) with server 28. When routing process 10 receives network traffic containing user 46's username, routing process 10 may perform 310 a directory lookup based on user 46's username, for example. Referring to FIG. 5, routing process 10 and/or routing device 12 may include a directory listing that associates unique identifiers with servers. FIG. 5 shows exemplary directory lookup table 500 with exemplary unique identifiers 502, 504, 410. Unique identifier 502 is shown associated with servers 508, 510, 512; unique identifier 504 is shown associated with servers 514, 516, 518; and unique identifier 410 is shown associated with unique identifiers 520, 522, 524. If routing process 10 receives network packet 400 with unique identifier 410, routing process 10 may perform 310 a directory or table lookup to determine if unique identifier 410 matches, for example, any of the unique identifiers listed in directory lookup table 500. If received unique identifier 410 matches a unique identifier in the lookup table, routing process 10 may receive a list of any or all servers associated with unique identifier 410. In this example, unique identifier 410 matches a unique identifier in directory lookup table 500. Accordingly, routing process 10 may receive 312 the list of application servers associated with routing process 10—namely servers 520, 522, 524, in this example.

The list of servers may be a prioritized list of servers (or groups of servers) to which routing process 10 should forward the network traffic. For example, the first server in the list—in this case server 520—may be the preferred server for servicing the client (e.g., user 46 utilizing client application 34 via laptop computer 22) while the other servers in the list—in this case servers 522, 524—may be backup servers for servicing the client (and/or may be primarily utilized for servicing other clients). Of course, the list may be prioritized in any order based on any rationale, such as computing power, physical location, up-time, etc.

Routing process 10 and/or the list may also include a default server address. A default server address may be an address of a backup or default server that can process network traffic if the other servers are unavailable. For example, if all servers in the list are unavailable, routing process may forward 308 network packet 400 to a default server. FIG. 5 shows directory lookup table 500 having default server address 528 associated with unique identifier 410. If routing process 10 forwards 308 network packet 400 (including unique identifier 410) to servers 520, 522, and/or 524, but receives an error message because servers 520, 522, 524 are unavailable, routing process 10 may forward network packet 410 to the server having default server address 526.

As shown, a default server address may also be associated with a unique identifier. For example, default server address 526 is shown associated with unique identifier 410. If routing process 10 forwards 308 network packet 400 (including unique identifier 410) to servers 520, 522, 524 and receives an error message because servers 520, 522, 524 are unavailable, routing process 10 may forward 308 network packet 400 to default server address 528 because default server address 528 is associated with unique identifier 410.

Default server addresses may also be global default server addresses. Global default server addresses may or may not be associated with unique identifiers. For example, global default server address 528 is shown as a global default server address. If a unique identifier is not associated with a default server address, routing process 10 may forward network traffic that includes the unique identifier to a global default server address for processing. For example, unique identifiers 502, 504 are not associated with a default server address. If routing process 10 receives a network packet that includes unique identifier 502 or unique identifier 504 and receives an error from the servers having server addresses associated with unique identifiers 502, 504 (namely server addresses 508, 510, 512 and server addresses 514, 516, 518, respectively), routing process 10 may forward the network packet to default server address 526.

Figure 6A:
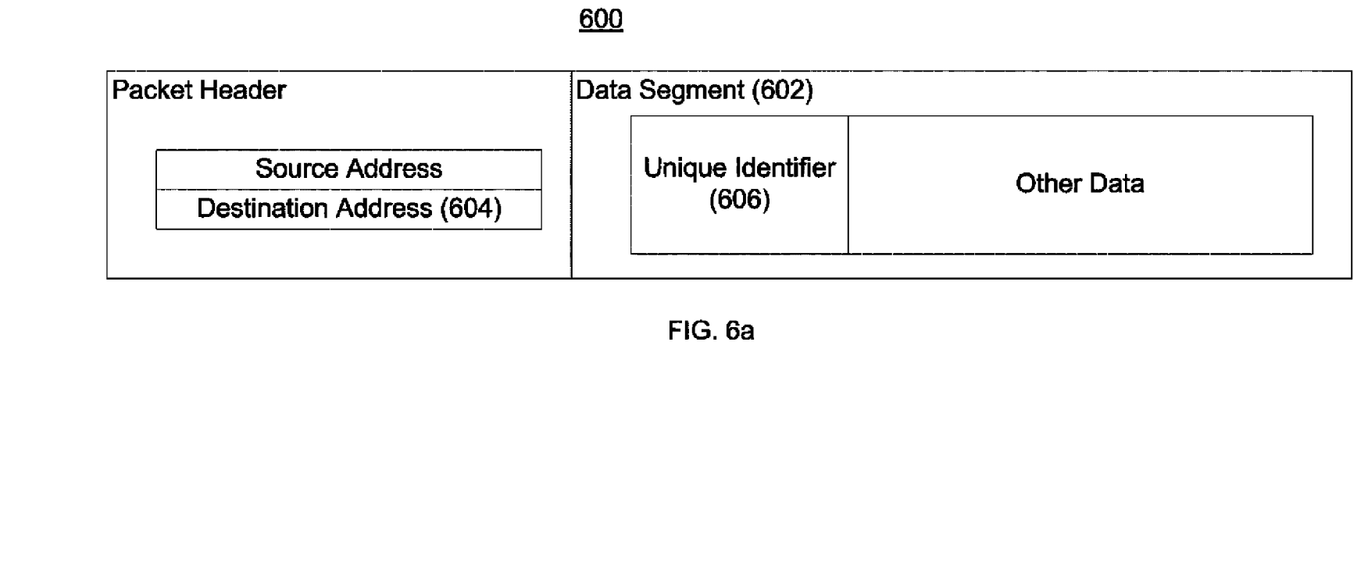
FIG. 6a is a diagrammatic view of a network traffic packet.
Figure 6B:
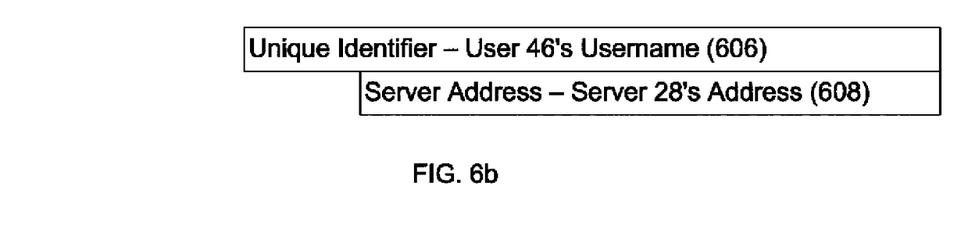
FIG. 6b is a table of associations between a unique identifier and a server address
Figure 6C:
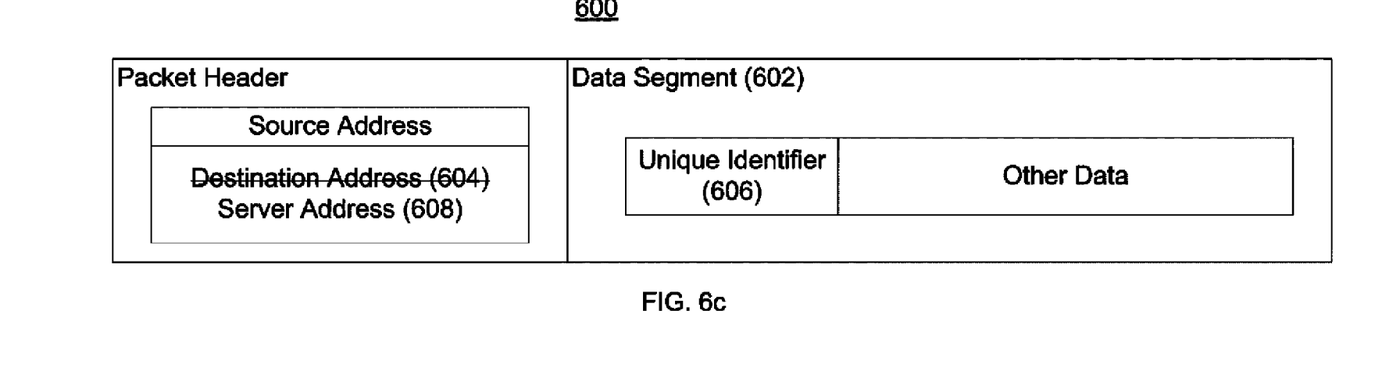
FIG. 6c is a diagrammatic view of a modified network traffic packet.

Turning to FIGS. 6*a*, 6*b*, and 6*c*, assume user 46 accesses client application 34 (an email client) and wishes to check his/her email. User 46 may then enter his/her username into application 34. In response, client application 34 may generate network packet 600. Client application 34 may include user 46's username within network packet 600's data segment, i.e. data segment 602. Client application 600 may also initially set destination address 604 to the address of routing device 12 or server 24, for example. However, as discussed, user 46's data (i.e. data 202) may not be stored on routing device 12 or server 24. Rather, data 202 may be stored on server computer 28.

When routing process 10 receives 304 network traffic from client application 34 (e.g., network packet 600), routing process 10 may parse 316 data segment 602 and identify 318 user 46's username as a unique identifier, i.e. unique identifier 606. As shown in FIG. 6*b*, routing process 10 and/or routing device 12 may contain or include lookup table 602, which may associate user 46's username with server 28 (e.g., which may indicate that server 28 may store user 46's data, and as such data traffic from user 46 should be directed to server 28). Even though packet 600 was originally addressed to routing device 12 or server 24, routing process 10 may forward 308 packet 600 to server 28 because lookup table 602 associates user 46's username with server 28. Accordingly, as shown in FIG. 6*c*, routing process 10 may overwrite 314 destination address 604 with address 608 (i.e. server 28's address).

A number of implementations have been described. Nevertheless, it will be understood that various modifications may be made. Accordingly, other implementations are within the scope of the following claims.

What is claimed is:

1. A method of routing computer network traffic comprising:
    associating, on a routing device, a unique identifier with at least one application server running an application;
    receiving, by said routing device, network traffic including said unique identifier and an intended network address, wherein said network traffic is intended to be forwarded to a network device associated with said intended network address;
    identifying, by said routing device, in response to receiving said network traffic, at least one of said application servers associated with said unique identifier; and
    forwarding, by said routing device, said network traffic to said at least one of said application servers associated with said unique identifier instead of said network device associated with said intended network address.

2. The method of claim 1 further comprising forwarding, by said routing device, said network traffic to one or more second application servers associated with said unique identifier if said one or more application servers are not available.

3. The method of claim 1 wherein identifying at least one of said application servers comprises: performing, by said routing device, a directory lookup based on said unique identifier; and
    receiving a list of said one or more application servers associated with said unique identifier.

4. The method of claim 3 wherein said list is pre-sorted in a priority order for routing.

5. The method of claim 1 wherein said unique identifier includes information identifying a user of said application running on said at least one application server.

6. The method of claim 1 wherein:
    a storage device of said at least one application server stores data associated with said unique identifier; and
    said data exist only on said at least one application server associated with said unique identifier.

7. The method of claim 1 wherein said unique identifier is included in an application layer of said network traffic.

8. The method of claim 1 further comprising overwriting said intended network address with an address of at least one of said application servers associated with said unique identifier.

9. A computer program product residing on a computer readable storage device, having a plurality of instructions stored thereon, which, when executed by a processor, cause the processor to perform operations comprising:
    associating, on a routing device, a unique identifier with at least one application server running an application;
    receiving, by said routing device, network traffic including said unique identifier and an intended network address, wherein said network traffic is intended to be forwarded to a network device associated with said intended network address;
    identifying, by said routing device, in response to receiving said network traffic, at least one of said application servers associated with said unique identifier; and
    forwarding, by said routing device, said network traffic to said at least one of said application servers associated with said unique identifier instead of said network device associated with said intended network address.

10. The computer program product of claim 9 wherein the operations further comprise forwarding, by said routing device, said network traffic to one or more second application servers associated with said unique identifier if said one or more application servers are not available.

11. The computer program product of claim 9 wherein identifying at least one of said application servers comprises:
    performing, by said routing device, a directory lookup based on said unique identifier; and
    receiving a list of said one or more application servers associated with said unique identifier.

12. The computer program product of claim 11 wherein said list is sorted in a priority order for routing.

13. The computer program product of claim 9 wherein said unique identifier includes information identifying a user of the application running on said at least one application server.

14. The computer program product of claim 9 wherein:
    a storage device of said at least one application server stores data associated with said unique identifier; and
    said data exist only on said at least one application server associated with said unique identifier.

15. The computer program product of claim 9 wherein said unique identifier is included in an application layer of said network traffic.

16. The computer program product of claim 9 wherein the operations further comprise overwriting said intended network address with an address of at least one of said application servers associated with said unique identifier.

17. A system comprising:
    one or more processors;
    one or more computer readable storage devices coupled to the one or more processors;

one or more software instructions residing on the one or more computer readable storage devices, which, when executed by the processor, cause the processor to perform operations comprising:

associating, on a routing device, a unique identifier with at least one application server running an application;

receiving network traffic including said unique identifier and an intended network address, wherein said network traffic is intended to be forwarded to a network device associated with said intended network address;

identifying, in response to receiving said network traffic, at least one of said application servers associated with said unique identifier; and     forwarding, by said routing device, said network traffic to said at least one of said application servers associated with said unique identifier instead of said network device associated with said intended network address.

18. The system of claim 17 wherein the operations further comprise forwarding said network traffic to one or more second application servers associated with said unique identifier if said one or more application servers are not available.

19. The system of claim 17 wherein identifying at least one of said application servers comprises:

performing, by said routing device, a directory lookup based on said unique identifier; and     receiving a list of said one or more application servers associated with said unique identifier.

20. The system of claim 19 wherein said list is sorted in a priority order for routing.

21. The system of claim 17 wherein said unique identifier includes information identifying a user of said application running on said at least one application server.

22. The system of claim 17 wherein:

a storage device of said at least one application server stores data associated with said unique identifier; and     said data exist only on said at least one application server associated with said unique identifier.

23. The system of claim 17 wherein said unique identifier is included in an application layer of said network traffic.

24. The system of claim 17 wherein the operations further comprise overwriting said intended network address with an address of at least one of said application servers associated with said unique identifier.

\* \* \* \* \*